(12) United States Patent
Carvalho

(10) Patent No.: US 11,170,392 B2
(45) Date of Patent: *Nov. 9, 2021

(54) SYSTEM AND METHOD FOR CLASSIFYING RELEVANT COMPETITORS

(71) Applicant: Home Depot Product Authority, LLC, Atlanta, GA (US)

(72) Inventor: Rodrigo Pierzchalski Carvalho, Atlanta, GA (US)

(73) Assignee: Home Depot Product Authority, LLC, Atlanta, GA (US)

( * ) Notice: Subject to any disclaimer, the term of this patent is extended or adjusted under 35 U.S.C. 154(b) by 14 days.

This patent is subject to a terminal disclaimer.

(21) Appl. No.: 16/708,985

(22) Filed: Dec. 10, 2019

(65) Prior Publication Data

US 2020/0111110 A1  Apr. 9, 2020

Related U.S. Application Data

(63) Continuation of application No. 13/841,487, filed on Mar. 15, 2013, now Pat. No. 10,504,127.

(Continued)

(51) Int. Cl.
    *G06Q 30/02* (2012.01)
(52) U.S. Cl.
    CPC .............................. *G06Q 30/0204* (2013.01)
(58) Field of Classification Search
    CPC ............. G06Q 30/0201; G06Q 30/00; G06Q 30/0604; G06Q 30/0631; G06Q 30/30; G06Q 30/02; G06Q 30/0204
    See application file for complete search history.

(56) References Cited

U.S. PATENT DOCUMENTS

| 4,996,642 A | 2/1991 | Hey |
| 6,041,311 A | 3/2000 | Chislenko et al. |

(Continued)

FOREIGN PATENT DOCUMENTS

| CA | 2469319 A1 * | 8/2003 | ........... G06F 16/832 |
| WO | 2010104619 B1 | 9/2010 | |

OTHER PUBLICATIONS

Dave, Kushal, Steve Lawrence, and David M. Pennock. "Mining the peanut gallery: Opinion extraction and semantic classification of product reviews." Proceedings of the 12th international conference on World Wide Web. 2003. (Year: 2003).*

(Continued)

*Primary Examiner* — Matthew S Gart
*Assistant Examiner* — Hamzeh Obaid
(74) *Attorney, Agent, or Firm* — Greenberg Traurig, LLP

(57) ABSTRACT

Competitors are classified in terms of products the competitors offer. A product set is generated from product information received from a user. Also, a competitor set is generated, where the competitor set comprises at least one competitor determined to be relevant to one or more products in the product set. A target price rule is generated that is operative to change a price offered by the user for the at least one product. A competitor's relevancy can be determined by considering factors such as: (1) unique visitors to the competitor's website, (2) reviews on the competitor's website (3), ratings on the competitor's website, (4) absolute number of products common to the user's website and the competitor's website, (5) percentage number of products common to the user's website and the competitor's website, and (6) number of products offered by the competitor that comprise the product set.

20 Claims, 6 Drawing Sheets

Related U.S. Application Data

(60) Provisional application No. 61/727,063, filed on Nov. 15, 2012.

(56) References Cited

U.S. PATENT DOCUMENTS

| | | | |
|---|---|---|---|
| 6,085,186 | A | 7/2000 | Christianson et al. |
| 6,606,625 | B1 | 8/2003 | Muslea et al. |
| 6,728,706 | B2 | 4/2004 | Aggarwal et al. |
| 7,117,163 | B1 | 10/2006 | Iyer et al. |
| 7,519,621 | B2 | 4/2009 | Harik |
| 7,702,700 | B2 | 4/2010 | Lee et al. |
| 7,899,701 | B1 | 3/2011 | Odom |
| 7,970,713 | B1 | 6/2011 | Gorelik et al. |
| 8,126,779 | B2 | 2/2012 | Wanker |
| 8,131,701 | B2* | 3/2012 | Barney ............... G06F 16/2465 707/705 |
| 8,140,381 | B1 | 3/2012 | Wu et al. |
| 8,165,925 | B2 | 4/2012 | Vailaya et al. |
| 8,386,298 | B2 | 2/2013 | Bai et al. |
| 8,719,142 | B1 | 5/2014 | Odom |
| 8,818,838 | B1 | 8/2014 | Sharma |
| 9,223,871 | B2 | 12/2015 | Surya |
| 9,916,590 | B2* | 3/2018 | Brogan ................. G06Q 30/02 |
| 2003/0110066 | A1 | 6/2003 | Walser et al. |
| 2003/0171978 | A1 | 9/2003 | Jenkins et al. |
| 2003/0177103 | A1 | 9/2003 | Ivonov et al. |
| 2004/0143508 | A1 | 7/2004 | Bohn et al. |
| 2004/0267762 | A1 | 12/2004 | Tunning et al. |
| 2005/0273380 | A1* | 12/2005 | Schroeder .......... G06Q 10/0639 705/7.31 |
| 2007/0038620 | A1 | 2/2007 | Ka et al. |
| 2007/0130090 | A1* | 6/2007 | Staib .................. G06Q 30/0222 705/400 |
| 2007/0226082 | A1 | 9/2007 | Leal |
| 2007/0244883 | A1 | 10/2007 | Bessieres et al. |
| 2007/0299743 | A1* | 12/2007 | Staib .................. G06Q 30/0204 705/7.33 |
| 2008/0046316 | A1 | 2/2008 | Shah et al. |
| 2008/0189279 | A1 | 8/2008 | Mayer et al. |
| 2008/0294996 | A1 | 11/2008 | Hunt et al. |
| 2008/0313165 | A1 | 12/2008 | Wu |
| 2009/0018996 | A1 | 1/2009 | Hunt et al. |
| 2009/0125549 | A1 | 5/2009 | Li |
| 2009/0144101 | A1 | 6/2009 | Malov |
| 2010/0010273 | A1 | 1/2010 | Belfadhel et al. |
| 2010/0083270 | A1 | 4/2010 | Kline et al. |
| 2010/0161566 | A1* | 6/2010 | Adair .................. G06F 16/2462 707/690 |
| 2010/0306031 | A1 | 12/2010 | McCauley et al. |
| 2011/0040611 | A1 | 2/2011 | Simmons et al. |
| 2011/0106581 | A1 | 5/2011 | Rohrbasser et al. |
| 2011/0112869 | A1* | 5/2011 | Greak ................... G06Q 40/08 705/4 |
| 2011/0153385 | A1 | 6/2011 | Bateni et al. |
| 2011/0191181 | A1 | 8/2011 | Blackhurst et al. |
| 2011/0209048 | A1 | 8/2011 | Scott et al. |
| 2011/0213644 | A1 | 9/2011 | Phene |
| 2011/0270628 | A1 | 11/2011 | Mital et al. |
| 2011/0320478 | A1 | 12/2011 | Carlson et al. |
| 2012/0046998 | A1 | 2/2012 | Staib et al. |
| 2012/0203760 | A1 | 8/2012 | Abraham et al. |
| 2012/0259891 | A1 | 10/2012 | Edoja |
| 2012/0284113 | A1 | 11/2012 | Pollak |
| 2012/0296792 | A1 | 11/2012 | Levoff et al. |
| 2012/0330934 | A1 | 12/2012 | Duboue et al. |
| 2013/0166348 | A1 | 6/2013 | Scotto |
| 2013/0275292 | A1 | 10/2013 | Cappucci et al. |
| 2014/0108308 | A1 | 4/2014 | Stout et al. |
| 2014/0136278 | A1 | 5/2014 | Carvalho |
| 2014/0136283 | A1 | 5/2014 | Carvalho et al. |
| 2014/0136494 | A1 | 5/2014 | Surya |
| 2014/0136549 | A1 | 5/2014 | Surya et al. |
| 2014/0149183 | A1 | 5/2014 | Liu et al. |
| 2014/0379535 | A1 | 12/2014 | Briet et al. |

OTHER PUBLICATIONS

Ezop, P. (1994). Database marketing research. Marketing Research, 6(4), 34. Retrieved from https://dialog.proquest.com/professional/docview/202672350?accountid=131444 (Year: 1994).*
Office Action received in Canadian counterpart application No. 2,833,453, dated Nov. 25, 2016, 6 pgs.
Office Action received in Canadian counterpart application No. 2,833,453, dated Mar. 23, 2016, 8 pgs.
Office Action received in Mexican counterpart application No. MX/a/2013/013451, dated Mar. 12, 2015, 5 pgs.
Liu, Bing, Minqing Hu, and Junsheng Cheng. "Opiinion observer: analyzing and comparing opinions on the web." Proceedings of the 14th international conference on World Wide Web. ACM, 2005. (Year: 2005).
Kushmerick, N. et al.: Wrapper Induction for Information Extraction, Int. Joint Conf. AI., (2007), 7 pgs.
Kushmerick, N. et al.: "The Wrapper Induction Environment", Proceedings on the Workshop on Software Tools for Developing Agents (AAAI), (1998), 2 pgs.
Kushmerick, N.: "Wrapper Induction for Information Extraction", Ph.D. Dissertation, University of Washington, (1997), pp. 1-264.
Final Office Action dated Jul. 10, 2015, issued in U.S. Appl. No. 13/841,136,..
Office Action dated Dec. 23, 2014, issued in U.S. Appl. No. 13/841,136.
Response to Office Action dated Jun. 23, 2015, filed in U.S. Appl. No. 13/841,136.
Examiner's Report dated Aug. 28, 2015, issued in related Canadian Patent Appl. No. 2833502.
Final Office Action dated Aug. 4, 2015, issued in U.S. Appl. No. 13/841,322.
Office Action dated Jan. 9, 2015, issued in U.S. Appl. No. 13/841,322.
Response to Office Action dated Jul. 9, 2015, filed in U.S. Appl. No. 13/841,322.
Final Office Action dated Sep. 25, 2015, issued in U.S. Appl. No. 13/837,644.
Office Action dated Jan. 16, 2015, issued in U.S. Appl. No. 13/837,644.
Response to Office Action dated Jul. 16, 2015, filed in U.S. Appl. No. 13/837,644.
Qu, H.: "Wrapper Induction: Construct wrappers automatically to extract information from web sources", CMPT 882 Presentation, Mar. 28, 2001, 4 pgs.
Examiner's Report dated Apr. 9, 2015, issued in corresponding Canadian Patent Application No. 2833356.
Notice of Allowance dated Jul. 27, 2015, issued in U.S. Appl. No. 13/837,961.
Office Action dated Nov. 19, 2014, issued in U.S. Appl. No. 13/838,195.
Response to Office Action dated May 19, 2015, filed in U.S. Appl. No. 13/838,195.
Final Office Action dated Jun. 18, 2015, issued in U.S. Appl. No. 13/838,195.
Response to Final Office Action dated Dec. 17, 2015, filed in U.S. Appl. No. 13/838,195.
Office Action dated Jan. 13, 2016, issued in U.S. Appl. No. 13/838,195.
Office Action dated Jan. 22, 2015, issued in U.S. Appl. No. 13/841,629.
Response to Office Action dated Jul. 22, 2015, issued in U.S. Appl. No. 13/841,629.
Final Office Action dated Aug. 11, 2015, issued in U.S. Appl. No. 13/841,629.
Response to Final Office Action dated Jan. 11, 2016, issued in U.S. Appl. No. 13/841,629.

* cited by examiner

FIG. 2

210 Product Overlap %

| 1 for 'yes' | 0% - 10% | 10% - 20% | 20% - 35% | 35% - 60% | 60% - 100% | TOTAL POINTS | Disqualified? |
|---|---|---|---|---|---|---|---|
| points | 0 | 0 | 0 | 0 | 1 | 4 | 0 |
| | | 1 | 2 | 3 | 4 | | |

215 Visitors

| 1 for 'yes' | 0 - 10k | 10k - 100k | 100k - 400k | 400k - 1M | 1M + | TOTAL POINTS | Disqualified? |
|---|---|---|---|---|---|---|---|
| points | 0 | 0 | 0 | 1 | 0 | 3 | 0 |
| | | 1 | 2 | 3 | 4 | | |

220 # of Reviews

| 1 for 'yes' | 0 - 30 | 30 - 100 | 100 - 500 | 500+ | n/a | TOTAL POINTS | Disqualified? |
|---|---|---|---|---|---|---|---|
| points | 0 | 0 | 1 | 0 | 0 | 2 | 0 |
| | | 1 | 2 | 3 | | | |

225 Avg. Review Rating

| 1 for 'yes' | 0 - 3.24 | 3.25 - 3.74 | 3.75 - 4.24 | 4.25 - 4.74 | 4.75+ | TOTAL POINTS | Disqualified? |
|---|---|---|---|---|---|---|---|
| points | 0 | 0 | 1 | 0 | 0 | 1 | 0 |
| | | 1 | 2 | 3 | | | |

230 Product Overlap Count

| 1 for 'yes' | 0 - 20 | 21+ | | | | TOTAL POINTS | Disqualified? |
|---|---|---|---|---|---|---|---|
| points | 0 | 1 | | | | 0 | 0 |
| | | 0 | | | | | |

| | Points |
|---|---|
| TOTAL — 250 | 10 |
| Max score — 255 | 14 |
| Relevancy Sc — 260 | 71.4% |
| Relevancy Tr — 265 | 60.0% |
| Above? | YES |
| IS RELEVANT — 270 | YES |

SYSTEM AND METHOD FOR CLASSIFYING RELEVANT COMPETITORS

CROSS-REFERENCE TO RELATED APPLICATIONS

This application is a continuation of and claims priority to U.S. patent application Ser. No. 13/841,487 (now granted as U.S. Pat. No. 10,504,127), filed Mar. 15, 2013, and entitled "SYSTEM AND METHOD FOR CLASSIFYING RELEVANT COMPETITORS," which is hereby incorporated by reference in its entirety. This application also claims priority to U.S. Provisional Patent Application No. 61/727,063, filed Nov. 15, 2012, and entitled "SYSTEM AND METHOD FOR CLASSIFYING RELEVANT COMPETITORS," which is hereby incorporated by reference in its entirety. This application is also related to, commonly assigned U.S. patent application Ser. No. 13/837,644, filed Mar. 15, 2013 and entitled "SYSTEM AND METHOD FOR AUTOMATIC WRAPPER INDUCTION BY APPLYING FILTERS," U.S. patent application Ser. No. 13/837,961 (now granted as U.S. Pat. No. 9,223,871), filed Mar. 15, 2013 and entitled "SYSTEM AND METHOD FOR AUTOMATIC WRAPPER INDUCTION USING TARGET STRINGS," and U.S. patent application Ser. No. 13/838,195, filed Mar. 15, 2013 and entitled "SYSTEM AND METHOD FOR AUTOMATIC PRODUCT MATCHING," the disclosures of which are incorporated by reference in their entirety. Copies of U.S. patent application Ser. Nos. 13/837,644, 13/837,961, and 13/838,195 are attached hereto as Appendices A, B, and C, respectively.

TECHNICAL FIELD

This disclosure relates generally to the field of competitive intelligence, and specifically to product assortment in the retail industry.

BACKGROUND

Competitive intelligence, as it relates to pricing, has been an important aspect of the retail business for decades. Today, consumers have tools that allow them to compare prices across thousands of retailers in seconds.

To be competitive, retailers today must: i) know who their competitors are, ii) know how much their competitors are charging for the goods that they carry, and iii) be able to act on this information.

Many retailers carry a very large number of products on their catalog, often times m excess of 100,000 different stock keeping units (SKUs) associated with different products. Each SKU is often sold by many different competitors at different prices. Competitors may change their prices for products at any time, which makes it even more difficult to determine the pricing of the products at different retailers.

Because of the large number of retailers selling goods online, it can be important that retailers know who their relevant competitors are; not only at the store level, but also at the "product group" level. "Product group," in this case, can be defined as a group of SKUs or other product identifiers. A "product group" can be a product category (e.g., digital cameras), a brand (e.g., Canon® products), or any pre-defined product group (e.g., high-end Canon® digital cameras).

SUMMARY

An objective of the present disclosure is to provide competitive intelligence related to classifying competitors for a retailer. Another objective of the present disclosure is to help retailers know who their competitors are for any given product-group. These and other objectives can be achieved in embodiments disclosed herein. In particular, embodiments may determine if an online retailer is a potential competitor for a pre-defined product group. Relevancy may be determined, for instance, by looking at product overlap, estimated traffic, average rating of online reviews, and a number of views for a website associated with the potential competitor. A product group may be products in a product category, brand, in a user-defined product group, etc.

In embodiments, a system may determine web pages for competitors that include relevant products to a customer of the system. One example of such a customer may be a business entity. One example of a business entity can be a retailer. This retailer may be selling a product and is interested in information relating to that product or similar ones from its competitors, including known and unknown competitors. These competitors may have a presence on the Internet. The system may be configured to pull information associated with products or product types from an unbound number of domains on the Internet. Examples of information associated with a product may include name, description, product attributes, SKU, price, image, etc. These competitors as well as their domains and websites may or may not be known by a customer requesting the information.

In this disclosure, the term "domain" is used in the context of the hierarchical Domain Name System (DNS) of the Internet. Those skilled in the art appreciate that the DNS refers to a hierarchical naming system for computers or any resource connected to the Internet. A network that is registered with the DNS has a domain name under which a collection of network devices are organized. Today, there are hundreds of millions of websites with domain names and content on them. As the number o websites continues to grow, pulling information associated with a product or products from an unbound number of domains on the Internet can be a very complex, tedious, and complicated process.

Embodiments disclosed herein can leverage wrapper induction and wrapper infection methodologies disclosed in Appendix A and Appendix B attached herewith to automate a data mining process across unbounded domains. Additionally, because each competitor may describe or define a product in different ways, it may be desirable or necessary to determine which products sold by different competitors refer to the same product. Embodiments disclosed herein can also leverage a novel approach disclosed in Appendix C attached herewith to match a product or product type of interest with product information crawled from the Internet. This matching process can help to ensure that any price or feature comparison made between a predefined product/product type and products/product types being sold by different competitors on the Internet are the same and/or relevant. Appendices A, B, and C are hereby incorporated by reference in their entireties.

In embodiments disclosed herein, a system is operable to obtain or otherwise gain knowledge on the products that competitors are selling and each competitor's pricing of the products. The system includes a user interface through which a customer can identify what products that the customer carries. In one embodiment, a customer can provide the system with a product catalog through the user interface or via other means.

The system may include a competitor classifier operable to determine what other retailers (potential or actual competitors of the customer of the system) are selling the same products and how much they are selling the products for. The competitor classifier may identify a retailer as a potential competitor of the customer. For each potential competitor, the competitor classifier may determine the following variables: (1) an estimated number of unique visitors to the potential competitor's website; (2) a number of user-reviews that the potential competitor has; (3) a review-rating associated with the potential competitor; (4) a percentage of product that overlap between a product group of the customer and the potential competitor (e.g., the potential competitor carries 80% of the same digital cameras products carried by the customer); and (5) a number of products that the potential competitor's product group overlaps with the customer's product group (e.g., the potential competitor carries 500 of the same digital cameras products carried by the customer).

Those skilled in the art will appreciate that the above list of variables is meant to be illustrative and that other variables may also be determined. In some embodiments, each variable may be associated with a weight. In some embodiments, the variables may be computed, weighted, added, and normalized to generate a value. In some embodiments, the generated value may be a number between 0 and 100. In some embodiments, if the generated value is above a configurable threshold (e.g., 60%), then the potential competitor may be considered a relevant competitor for the product group of interest.

Embodiments can provide many advantages. For example, although retailers often know who their top competitors are, it is difficult to determine who their relevant competitors are for each one of their product groups. This method allows a retailer to know who their top competitors are for each one of their product groups. With this information in hand, retailers can create pricing rules for a certain product group against the competitors that are relevant for that product group. For example, while a company may have many competitors for their store in general, in a particular product group such as digital cameras, they may be competing with many niche stores that specialize in digital cameras. Knowing who their competitors are allows the company to create effective, targeted pricing rules.

These, and other aspects will be better appreciated and understood when considered in conjunction with the following description and the accompanying drawings. The following description, while indicating various embodiments and numerous specific details thereof, is given by way of illustration and not of limitation. Many substitutions, modifications, additions or rearrangements may be made within the scope of this disclosure, which includes all such substitutions, modifications, additions or rearrangements.

BRIEF DESCRIPTION OF THE FIGURES

The drawings accompanying and forming part of this specification are included to depict certain aspects of various embodiments. A clearer impression of these embodiments, and of the components and operation of systems provided with them, will become more readily apparent by referring to the exemplary, and therefore nonlimiting, embodiments illustrated in the drawings, wherein identical reference numerals designate the same components. Note that the features illustrated in the drawings are not necessarily drawn to scale.

FIG. 2 depicts an example user interface of an embodiment of a competitor classifier system.

FIGS. 3-5 depict an example user interface of an embodiment of a competitor classifier system through which competitor reports may be generated and presented to an authorized user of a customer of the system in various ways.

DETAILED DESCRIPTION

Various features and advantageous the present disclosure are explained more fully with reference to the nonlimiting embodiments that are illustrated in the accompanying drawings and detailed in the following description. Descriptions of well-known starting materials, processing techniques, components and equipment are omitted so as not to unnecessarily obscure the present disclosure. It should be understood, however, that the detailed description and the specific examples, while indicating preferred embodiments, are given by way of illustration only and not by way of limitation. Various substitutions, modifications, additions and/or rearrangements within the spirit and/or scope of the underlying inventive concept will become apparent to those skilled in the art from this disclosure. Embodiments discussed herein can be implemented in suitable computer-executable instructions that may reside on a computer readable medium (e.g., a hard disk (HD)), hardware circuitry or the like, or any combination.

Before discussing specific embodiments, a brief overview of the context of the disclosure may be helpful. Embodiments of systems and methods described herein may determine if an online retailer is a potential competitor for a customer in a particular product group (e.g., a product group defined by the customer using, for instance, SKUs or other product identifiers). A product group may include products in a product category, brand, in a user-defined product group, etc. Relevancy of potential competitors may be determined, for instance, by looking at product overlap, estimated traffic, average rating of online reviews, and a number of views for a web site associated with a potential competitor. By knowing who their competitors are for a product group of interest, a retailer may create targeted pricing rules for the product group.

Figure 1:
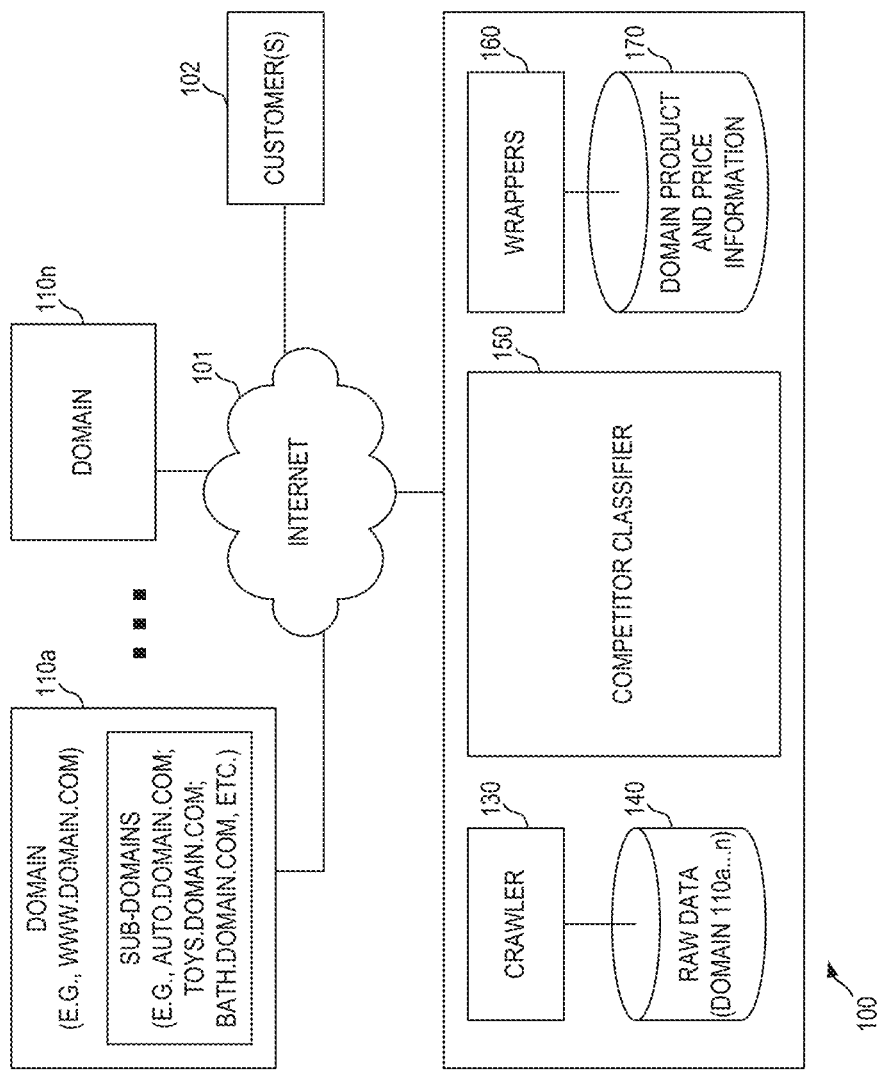
FIG. 1 depicts a block diagram of one embodiment of an architecture in which a competitor classifier system may be implemented.

Turning now to FIG. 1, a block diagram illustrating an exemplary system 100 is shown. System 100 couples to a network such as the Internet 101 and has access to domains 110a . . . 110n. Each domain may have a common network name (domain name) under which a collection of network devices are organized (e.g., domain.com). Each domain may have one or more sub-domains (e.g., abc.domain.com, xyz.domain.com, etc.) according to the hierarchical Domain Name System (DNA) of the Internet. The collection of network devices in a domain may include one or more server machines hosting a website representing the domain (e.g., www.domain.com).

A web site (also referred to as Web site, web site, or site) refers to a set of related web pages (also referred to as pages) containing content such as text, images, video, audio, etc. A website can be accessible via a network such as the Internet or a private local area network through an Internet address known as a Uniform Resource Locator (URL). All publicly accessible websites collectively constitute the World Wide Web.

Crawler 130 of system 100 may crawl the Internet 101 across domains 110a-110n for data and store them in raw data database 140. The data obtained by crawler 130 may be associated with retail products. Wrappers 160 may be generated using techniques disclosed in Appendix A and/or Appendix B to extract desired information, such as domain product and price information, from the raw data obtained by crawler 130. Other suitable wrapper generation techniques may also be used. The domain product and price information thus obtained may be stored at database 170.

System 100 may include competitor classifier system or module 150. Functionality of this feature will now be described in detail. Competitor classifier module 150 may be configured to receive a user defined product group and determine who are the relevant competitors associated with the product group. The relevant competitors for the product group may be determined based on weighted variables associated with a number of unique visitors that the competitor's website has over a time period, a number of reviews and review ratings of the competitor's web site, a number of overlapping products that the retailer and a competitor carry, a percentage of overlapping products that the retailer and a competitor carry etc.

The number of unique visitors that a competitor's website has may be obtained from a data source or website communicatively connected to system 100. An example data source or website that provides this type of information may be www.compete.com. Likewise, the number of reviews and the review ratings associated with a potential competitor's website may be obtained from a data source or website. An example data source or website that provides this type of information may be www.google.com. In some embodiments, the number and percentage of overlapping products that a retailer and their competitor(s) carry may be determined utilizing embodiments described in the attached Appendices A, B, and C, which form part of this disclosure.

In one embodiment, each of the variables may have a relative weight. In one embodiment, the variables may be weighted, added together, and normalized to produce a value indicating relevancy. If the relevancy value is above a certain threshold, then the potential competitor may be considered a relevant competitor for the product group of interest. An example threshold may be 60.

FIG. 2 depicts one embodiment of a table 200 associated with a product group of interest for a potential competitor. Table 200 may include variables such as the product percentage overlap 210, the number of visitors 215 the potential competitor's website had over a period of time, the number of reviews 220 the, competitor's website had, the average of the reviews 225, and the product overlap count 230.

Each of the variables may have different threshold ranges 235 with respective weights 240. In one embodiment, product percentage overlap variable 210 may have thresholds ranges 235 associated therewith if a potential competitor has a product overlap of 0-10%, 10-20%, 60-100%, etc. Based on which threshold range 235 a competitor should be classified for a particular variable and the weight 240, a total number of points 237 may be determined for a potential competitor for that variable. For example, as shown in FIG. 2, a potential competitor may have a product percentage overlap 210 in the range of 60-100% and the weight 240 for that threshold range 235 may be four. Therefore, the potential competitor may be assigned a total number 237 of four points for the percentage overlap variable 210.

This calculation is performed for each of the variables 210, 215, 220, 225, and 230 to generate a total number 237 for each variable. The total numbers 237 are then added to produce a total score points 250. The total score 250 is computed relative to the maximum possible score points 255 to generate a relevancy score 260. If the relevancy score 260 is higher than a relevancy threshold 265, then the potential competitor is considered a relevant competitor and displayed accordingly in box 270.

Accordingly, total point score 250 may represent a summation of points score 237 for each weighted variable. Max score 255 may represent a summation of the highest possible point score of the weighted variables for a potential competitor. Relevancy score 260 may represent how relevant a potential competitor is, and may be based on max score 255 and point score 250. In one embodiment, relevancy score may be determined by dividing point score 250 by max score 255.

Relevancy threshold 265 may be a threshold associated with the relevancy of a potential competitor. If a potential competitor has a relevancy score 260 above relevancy threshold 265, then relevancy indicator 270 may indicate that the potential competitor is a relevant competitor for the product group. If the potential competitor has a relevancy score 260 below relevancy threshold 265, then the relevancy indicator 270 may indicate that the potential competitor is not a relevant competitor for the product group.

One skilled in the art will appreciate that threshold ranges 235, weights 240 for threshold ranges 235, relevancy score 260, and/or relevancy threshold 265 may be determined based on a desired configuration for a product group and may vary from implementation to implementation.

In one embodiment, each variable may include a disqualifier 245, where if the potential competitor has a variable in a certain disqualified range or value, then the potential competitor is automatically disqualified from being a relevant competitor, even if the potential competitor's relevancy score 260 is above the relevancy threshold 265. For example, in one embodiment, if the product overlap variable is between 0-10% (i.e., there is no or little overlap of products in the product group), then the potential competitor may be automatically disqualified from being a relevant competitor.

Figure 3:
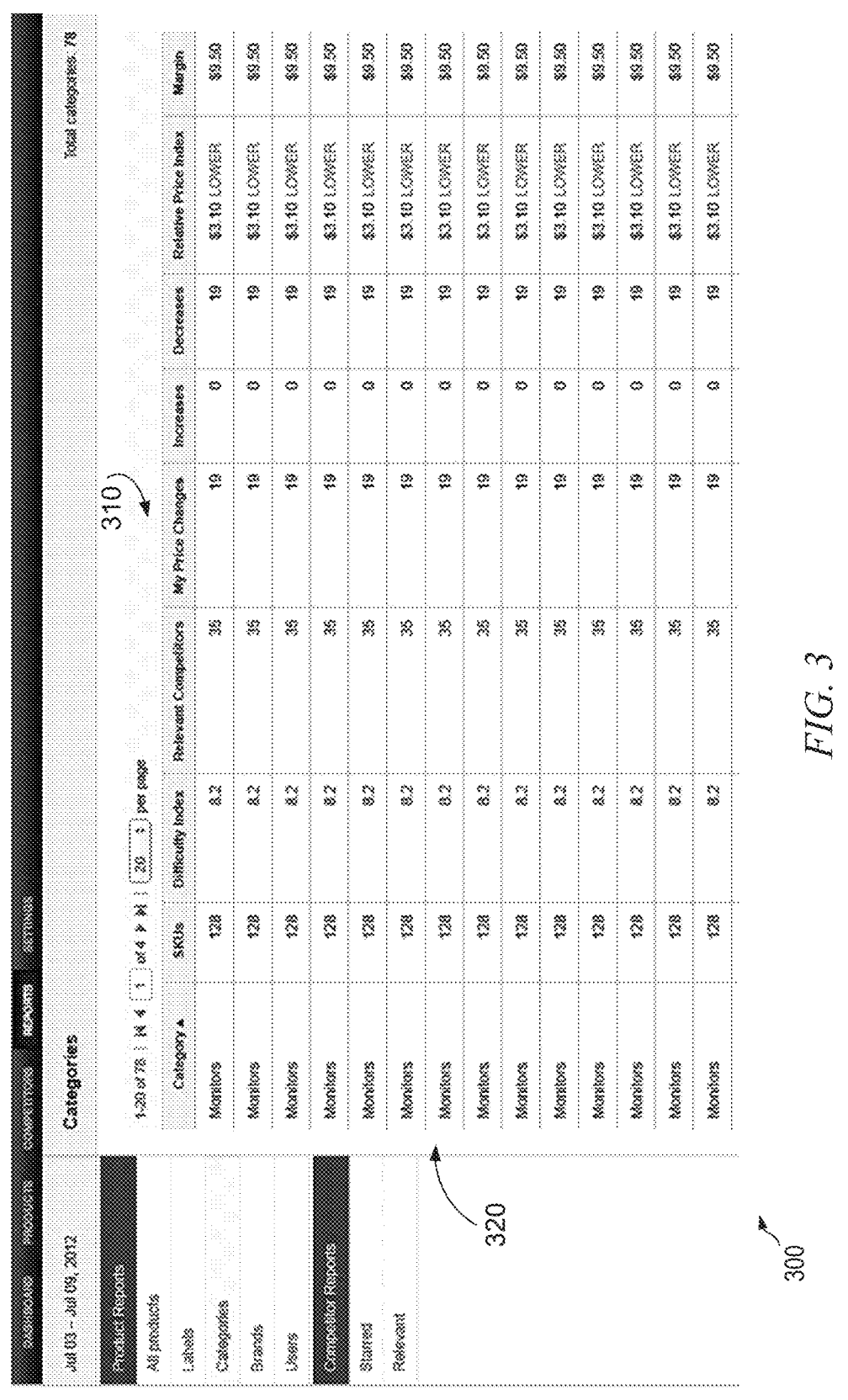

Now that relevant competitors are determined, FIG. 3 depicts an example user interface 300 through which relevant competitors can be compared according to one embodiment. User interface 300 may include a table 310 with entries associated with a product group 320 for a retailer (e.g., customer 102 of system 100). In one embodiment, the product group 320 may be monitors. For each entry 320 in table 310, user interface 300 may include data associated with how many products the retailer carries for the product group, a number of relevant competitors the retailer has in the product group, etc. An authorized user of the customer may be able to select, via user interface 300, the relevant competitors in product group 320 to view further information associated with the relevant competitors. This is further illustrated in FIG. 4.

Figure 4:
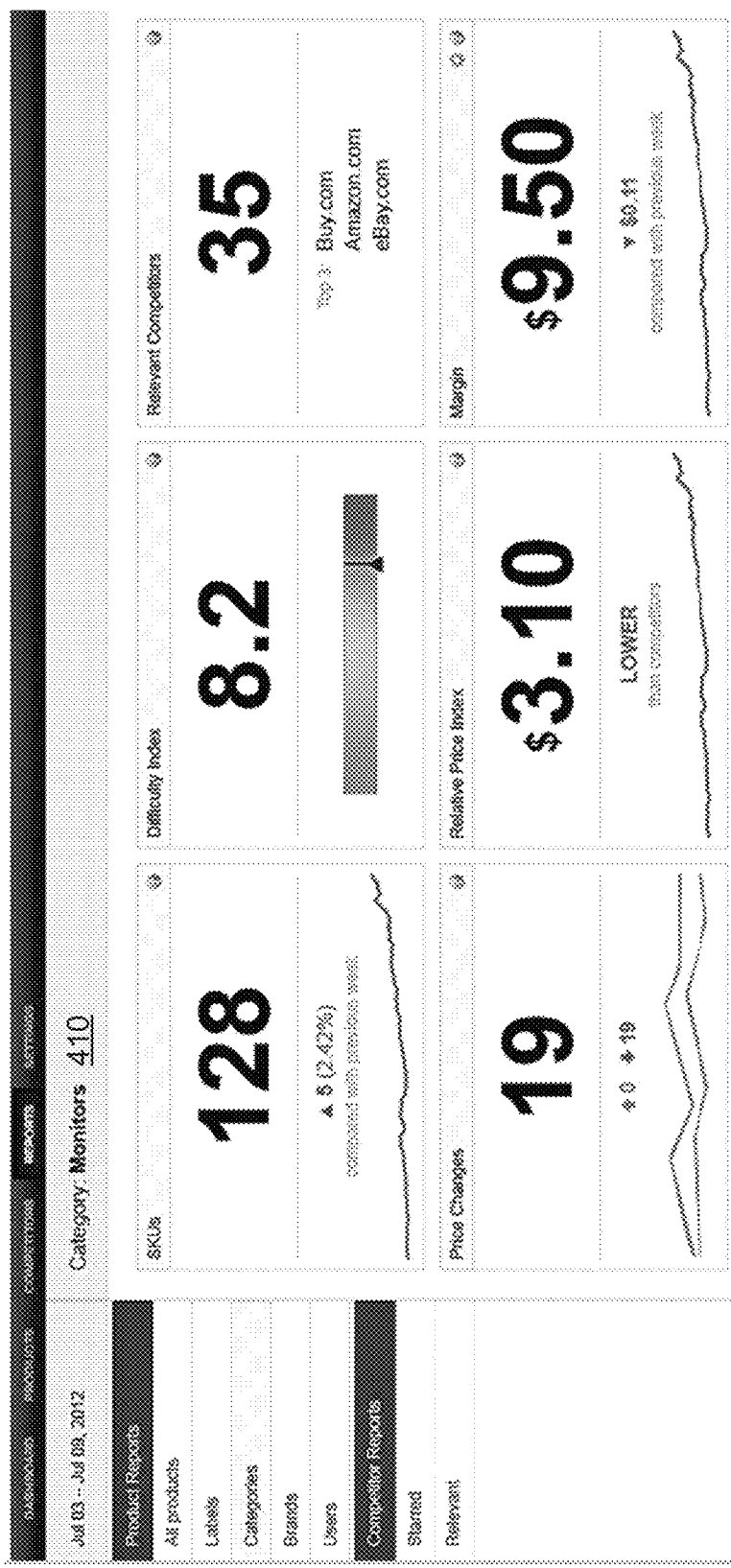
Figure 5:

As shown in FIG. 4, a user interface 400 implementing an embodiment of competitor classifier module 150 may provide data associated with a product group 410 for a retailer. In one embodiment, product group 410 may be monitors, and user interface 400 may provide data associated with product group 410, including, but are not limited to, a number of products (e.g., identified by SKUs) a customer carries for product group 410, a number of relevant competitors the customer has in product group 410, relative price index in product group 410, profit margin for product group 410, etc. An authorized user of the customer may be able to select, via user interface 400, the relevant competitors that the customer has in product group 410 to view further information associated with the relevant competitors. In the example of FIG. 4, the customer has 35 relevant competitors, as determined by an embodiment of competitor classifier module 150. FIG. 5 depicts a user interface 500 providing further information associated with such relevant competitors.

As illustrated in FIG. 5, a customer may have a set of relevant competitors (e.g., 35) in a product set (e.g., product category 510). A list of top relevant competitors in product category 510 may be generated and displayed via user interface 500 to authorized user of the customer. User interface 500 may include various information such as the relevancy scores of the relevant competitors, names of the relevant competitors, a relevancy index associated with how relevant a competitor is, etc.

User interface 500 may also include additional information such as a product overlap associated with products that the relevant competitors carries and the products in the product group, a number of unique visitors that the relevant competitor's website has over a time period, a number of reviews associated with the competitor's website, and the average rating of the reviews associated with the competitor's website that are used to determine the competitor's relevancy score.

By determining what competitors are relevant competitors for a product set, a retailer may determine the products for a product group of interest, determine products that relevant competitors carry that the retailer does not, determine what products the retailer carries that the relevant competitors do not, etc. This can help the retailer to refine their product offerings and further improve their bottom line, thereby becoming more competitive in each product group of interest.

Figure 6:
FIG. 6 depicts a flow chart illustrating operation of an example system for classifying relevant competitors.

FIG. 6 depicts an example flow chart 600 illustrating an embodiment of a method for determining relevant competitors for a product group of interest to a retailer.

At step 610, a weighted variable associated with a number of unique visitors that a potential competitor's website had over a time period may be determined.

At step 620, a weighted variable associated with the number of user-reviews that the potential customer's website has may be determined.

At step 630, a weighted variable associated with the average rating of the user-reviews that the potential customer's website has may be determined.

At step 640, a weighted variable associated with the percentage overlap between the products within the product group and the products the potential competitor carries.

At step 650, a weighted variable associated with the number of the products within the product group that the products the potential competitor carries.

At step 660, the weighted variables may added together to determine a relevancy score.

At step 670, the relevancy score may be compared to a relevancy threshold to determine if the potential competitor is a relevant competitor.

Although the present disclosure has been described in terms of specific embodiments, these embodiments are merely illustrative, and not restrictive. The description herein of illustrated embodiments, including the description in the Abstract and Summary, is not intended to be exhaustive or to limit the disclosure to the precise forms disclosed herein (and in particular, the inclusion of any particular embodiment, feature or function within the Abstract or Summary is not intended to limit the scope of the disclosure to such embodiments, features or functions). Rather, the description is intended to describe illustrative embodiments, features and functions in order to provide a person of ordinary skill in the art context to understand the present disclosure without limiting same to any particularly described embodiment, feature or function, including any such embodiment feature or function described in the Abstract or Summary. While specific embodiments are described herein for illustrative purposes only, various equivalent modifications are possible, as those skilled in the relevant art will recognize and appreciate. As indicated, these modifications may be made in light of the foregoing description of illustrated embodiments and are to be included within the spirit and scope of the disclosure. Thus, various changes and substitutions are intended in the foregoing disclosures, and it will be appreciated that in some instances some features of embodiments will be employed without a corresponding use of other features without departing from the scope and spirit as set forth. Therefore, many modifications may be made to adapt a particular situation or material.

Reference throughout this specification to "one embodiment," "an embodiment," or "a specific embodiment" or similar terminology means that a particular feature, structure, or characteristic described in connection with the embodiment is included in at least one embodiment and may not necessarily be present in all embodiments. Thus, respective appearances of the phrases "in one embodiment," "in an embodiment," or "in a specific embodiment" or similar terminology in various places throughout this specification are not necessarily referring to the same embodiment. Furthermore, the particular features, structures, or characteristics of any particular embodiment may be combined in any suitable manner with one or more other embodiments. It is to be understood that other variations and modifications of the embodiments described and illustrated herein are possible in light of the teachings herein.

In the description herein, numerous specific details are provided, such as examples of components and/or methods, to provide a thorough understanding of described embodiments. One skilled in the relevant art will recognize, however, that an embodiment may be able to be practiced without one or more of the specific details, or with other apparatus, systems, assemblies, methods, components, materials, parts, and/or the like. In other instances, well-known structures, components, systems, materials, or operations are not specifically shown or described in detail to avoid obscuring aspects of embodiments. A person of ordinary skill in the art will recognize that additional embodiments are readily understandable from the disclosure.

Embodiments discussed herein can be implemented in a computer communicatively coupled to a network (for example, the Internet), another computer, or in a standalone computer. As is known to those skilled in the art, a suitable computer can include a central processing unit ("CPU"), at least one read-only memory ("ROM"), at least one random access memory ("RAM"), at least one hard drive ("HD"), and one or more input/output ("I/O") device(s). The I/O devices can include a keyboard, monitor, printer, electronic pointing device (for example, mouse, trackball, stylist, touch pad, etc.), or the like.

ROM, RAM, and HD are computer memories for storing computer-executable instructions executable by the CPU or capable of being complied or interpreted to be executable by the CPU. Suitable computer-executable instructions may reside on a computer readable medium (e.g., ROM, RAM, and/or HD), hardware circuitry or the like, or any combination thereof. Within this disclosure, the term "computer readable medium" or is not limited to ROM, RAM, and HD and can include any type of data storage medium that can be read by a processor. For example, a computer-readable medium may refer to a data cartridge, a data backup magnetic tape, a floppy diskette, a flash memory drive, an optical data storage drive, a CD-ROM, ROM, RAM, HD, or the like. The processes described herein may be implemented in suitable computer-executable instructions that may reside on a computer readable medium (for example, a disk, CD-ROM, a memory, etc.). Alternatively, the computer-executable instructions may be stored as software code components on a direct access storage device array, magnetic tape, floppy diskette, optical storage device, or other appropriate computer-readable medium or storage device.

Any suitable programming language can be used, individually or m conjunction with another programming language, to implement the routines, methods or programs of embodiments described herein, including C, C++, Java, JavaScript, HTML, or any other programming or scripting language, etc. Other software/hardware/network architectures may be used. For example, the functions of the disclosed embodiments may be implemented on one computer or shared/distributed among two or more computers in or across a network. Communications between computers implementing embodiments can be accomplished using any electronic, optical, radio frequency signals, or other suitable methods and tools of communication in compliance with known network protocols.

Different programming techniques can be employed such as procedural or object oriented. Any particular routine can execute on a single computer processing device or multiple computer processing devices, a single computer processor or multiple computer processors. Data may be stored in a single storage medium or distributed through multiple storage mediums, and may reside in a single database or multiple databases (or other data storage techniques). Although the steps, operations, or computations may be presented in a specific order, this order may be changed in different embodiments. In some embodiments, to the extent multiple steps are shown as sequential in this specification, some combination of such steps in alternative embodiments may be performed at the same time. The sequence of operations described herein can be interrupted, suspended, or otherwise controlled by another process, such as an operating system, kernel, etc. The routines can operate in an operating system environment or as stand-alone routines. Functions, routines, methods, steps and operations described herein can be performed in hardware, software, firmware or any combination thereof.

Embodiments described herein can be implemented in the form of control logic in software or hardware or a combination of both. The control logic may be stored in an information storage medium, such as a computer-readable medium, as a plurality of instructions adapted to direct an information processing device to perform a set of steps disclosed in the various embodiments. Based on the disclosure and teachings provided herein, a person of ordinary skill in the art will appreciate other ways and/or methods to implement the described embodiments.

It is also within the spirit and scope of the disclosure to implement in software programming or code an of the steps, operations, methods, routines or portions thereof described herein, where such software programming or code can be stored in a computer-readable medium and can be operated on by a processor to permit a computer to perform any of the steps, operations, methods, routines or portions thereof described herein. Various embodiments may be implemented by using software programming or code in one or more general purpose digital computers, by using application specific integrated circuits, programmable logic devices, field programmable gate arrays, optical, chemical, biological, quantum or nanoengineered systems, or components and mechanisms may be used. In general, the functions of various embodiments can be achieved by any means as is known in the art. For example, distributed, or networked systems, components and circuits can be used. In another example, communication or transfer (or otherwise moving from one place to another) of data may be wired, wireless, or by any other means.

A "computer-readable medium" may be any medium that can contain, store, communicate, propagate, or transport the program for use by or in connection with the instruction execution system, apparatus, system or device. The computer readable medium can be, by way of example only but not by limitation, an electronic, magnetic, optical, electromagnetic, infrared, or semiconductor system, apparatus, system, device, propagation medium, or computer memory. Such computer-readable medium shall generally be machine readable and include software programming or code that can be human readable (e.g., source code) or machine readable (e.g., object code). Examples of non-transitory computer-readable media can include random access memories, read-only memories, hard drives, data cartridges, magnetic tapes, floppy diskettes, flash memory drives, optical data storage devices, compact-disc read-only memories, and other appropriate computer memories and data storage devices. In an illustrative embodiment, some or all of the software components may reside on a single server computer or on any combination of separate server computers. As one skilled in the art can appreciate, a computer program product implementing an embodiment disclosed herein may comprise one or more non-transitory computer readable media storing computer instructions translatable by one or more processors in a computing environment.

A "processor" includes any, hardware system, mechanism or component that processes data, signals or other information. A processor can include a system with a general-purpose central processing unit, multiple processing units, dedicated circuitry for achieving functionality, or other systems. Processing need not be limited to a geographic location, or have temporal limitations. For example, a processor can perform its functions in "real-time," "offline," in a "batch mode," etc. Portions of processing can be performed at different times and at different locations, by different (or the same) processing systems.

It will also be appreciated that one or more of the elements depicted in the drawings/figures can also be implemented in a more separated or integrated manner, or even removed or rendered as inoperable in certain cases, as is useful in accordance with a particular application. Additionally, any signal arrows in the drawings/figures should be considered only as exemplary, and not limiting, unless otherwise specifically noted.

As used herein, the terms "comprises," "comprising," "includes," "including," "has," "having," or any other variation thereof, are intended to cover a non-exclusive inclusion. For example, a process, product, article, or apparatus that comprises a list of elements is not necessarily limited only those elements but may include other elements not expressly listed or inherent to such process, process, article, or apparatus.

Furthermore, the term "or" as used herein is generally intended to mean "and/or" unless otherwise indicated. For example, a condition A or B is satisfied by any one of the following: A is true (or present) and B is false (or not present), A is false (or not present) and B is true (or present), and both A and B are true (or present). As used herein, including the claims that follow, a term preceded by "a" or "an" (and "the" when antecedent basis is "a" or "an") includes both singular and plural of such term, unless clearly indicated within the claim otherwise (i.e., that the reference "a" or "an" clearly indicates only the singular or only the plural). Also, as used in the description herein and throughout the claims that follow, the meaning of "in" includes "in" and "on" unless the context clearly dictates otherwise.

What is claimed is:

1. A system for classifying competitors of a user of the system, the system comprising:
   a website crawler that runs on a processor, the website crawler operable to obtain raw data from a plurality of Internet domains associated with a plurality of potential competitors' websites, wherein one or more wrappers is applied to the raw data to extract competitor product information from the raw data; and
   a competitor classifier that runs on the processor, the competitor classifier operable to:
      compute respective relevancy scores of a plurality of potential competitors to at least one product in a product set by assigning a value to a variable, the variable comprising:
         an absolute number of products common to the user's web site and the potential competitor's web site, or
         a percentage of products common to the user's website and the potential competitor's web site,
         wherein the absolute number or the percentage is determined at least in part based on the competitor product information extracted from the raw data;
      determine that one or more of the plurality of potential competitors has a respective computed relevancy score greater than a threshold value; and
      add each of the one or more of the plurality of potential competitors having a respective computed relevancy score greater than the threshold value to a competitor set.

2. The system of claim 1, wherein the competitor classifier is further operable to:
   determine that a respective number of unique visitors to a respective website of at least one of the plurality of potential competitors over a period of time is below a predetermined threshold; and
   disqualify, based on the respective number of unique visitors being below the predetermined threshold, the at least one of the plurality of potential competitors from the competitor set.

3. The system of claim 1, wherein the competitor classifier is further operable to:
   determine that a respective number of ratings or reviews on a respective website of at least one of the plurality of potential competitors is below a predetermined threshold; and
   disqualify, based on the respective number of ratings or reviews being below the predetermined threshold, the at least one of the plurality of potential competitors from the competitor set.

4. The system of claim 1, wherein the competitor classifier is further operable to:
   determine that a respective number of views of a respective website of at least one of the plurality of potential competitors over a period of time is below a predetermined threshold; and
   disqualify, based on the respective number of views being below the predetermined threshold, the at least one of the plurality of potential competitors from the competitor set.

5. The system of claim 1, wherein the absolute number of products or the percentage of products is determined for only a particular brand of products.

6. The system of claim 1, wherein the absolute number of products or the percentage of products is determined for only a particular category of products.

7. The system of claim 1, wherein the absolute number of products or the percentage of products is determined for only a user-defined product group.

8. The system of claim 1, wherein the competitor classifier is further operable to determine the respective relevancy scores based at least in part on at least one of unique visitors to the potential competitor's website, reviews on the potential competitor's website, ratings on the potential competitor's website, or a number of products offered by the potential competitor that comprise the product set.

9. A method for classifying competitors, the method comprising:
   obtaining, by a website crawler run on a processor, raw data from a plurality of Internet domains associated with a plurality of potential competitors' websites;
   applying, by the processor, one or more wrappers to the raw data to extract competitor product information from the raw data;
   computing, by the processor, respective relevancy scores of a plurality of potential competitors to at least one product in a product set by assigning a value to a variable, the variable comprising:
      an absolute number of products common to a user's website and the potential competitor's website, or
      a percentage of products common to the user's website and the potential competitor's web site,
      wherein the absolute number or the percentage is determined at least in part based on the competitor product information extracted from the raw data; and
   determining, by the processor, that one or more of the potential competitors have a respective computed relevancy score that is greater than a threshold value; and
   adding, by the processor, the one or more competitors having a respective computed relevancy score greater than the threshold value to a competitor set.

10. The method of claim 9, wherein the competitor classifier is further operable to determine the respective relevancy scores based at least in part on unique visitors to the potential competitor's website, reviews on the potential competitor's website, ratings on the potential competitor's website, or a number of products offered by the potential competitor that comprise the product set.

11. The method of claim 9, wherein the absolute number of products or the percentage of products is determined for only a particular brand of products, only a particular category of products, or only a user-defined product group.

12. The method of claim 9, wherein the variable is a first variable, and the method further comprises:
   assigning, by the processor, a value to a second variable related to a website of at least one of the plurality of potential competitors, the second variable comprising:
      a number of unique visitors to a website of at least one of the plurality of potential competitors over a first period of time,
      a number of ratings on the website,
      a number of reviews on the website, or a number of views of the website over a second period of time; and disqualifying, by the processor, based on the second variable being below a predetermined threshold, the at least one of the plurality of potential competitors from the competitor set.

13. The method of claim 12, wherein the second variable is determined at least in part based on the competitor product information extracted from the raw data.

14. The method of claim 9, further comprising displaying, by the processor, product set information on a display of a computing device, wherein the product set information comprises, for the at least one product in the product set:
a product SKU,
a product category, or
a product brand.

15. The method of claim 9, further comprising displaying, by the processor, competitor set information on a display of a computing device, wherein the competitor set information comprises, for each competitor in the competitor set:
the respective relevancy scores of the plurality of potential competitors,
the variable, or
the absolute number or percentage of products common to the user's web site and the potential competitor's website.

16. The method of claim 9, further comprising generating, by the processor, a target price rule for the at least one product operative to change a price offered by the user for the at least one product.

17. The method of claim 9, wherein the plurality of potential competitors are discovered from an unbounded number of Internet domains.

18. An apparatus for classifying competitors, the apparatus comprising:
a memory; and
a processor coupled to the memory, the processor operable to:
generate a product set from product information received from a user; and
generate a competitor set, the competitor set comprising at least one competitor determined to be relevant to at least one product in the product set, the processor operable to generate the competitor set by calculating respective relevancy scores of a plurality of potential competitors by:
obtaining, by a website crawler run on a processor, raw data from a plurality of Internet domains associated with a plurality of potential competitors' websites;
applying one or more wrappers to the raw data to extract competitor product information from the raw data;
assigning a respective value to a variable for each competitor, the variable comprising:
an absolute number of products common to the user's web site and the potential competitor's web site, or
a percentage of products common to the user's website and the potential competitor's website,
wherein the absolute number or the percentage is determined at least in part based on the product information extracted from the raw data; and
determining, for one or more of the plurality of potential competitors, that a respective computed relevancy score is greater than a threshold value; and
adding, each of the one or more of the plurality of potential competitors having a computed relevancy score greater than the threshold value to a competitor set.

19. The apparatus of claim 18, wherein the respective relevancy scores are further determined based at least in part on at least one of unique visitors to the potential competitor's website, reviews on the potential competitor's website, ratings on the potential competitor's web site, or a number of products offered by the potential competitor that comprise the product set.

20. The apparatus of claim 18, wherein the at least one of the unique visitors, the reviews, the ratings, or the number of products is determined at least in part based on the competitor product information extracted from the raw data.

* * * * *